United States Patent [19]
Tatara et al.

[11] Patent Number: 5,911,846
[45] Date of Patent: Jun. 15, 1999

[54] METHOD OF ASSEMBLING PNEUMATIC TIRES

[75] Inventors: Tetsuo Tatara, Hyogo; Shigeo Kudo; Yasuhide Ohtake, both of Miyagi, all of Japan

[73] Assignee: Toyo Tire & Rubber Co., Ltd., Osaka, Japan

[21] Appl. No.: 08/902,365

[22] Filed: Jul. 29, 1997

Related U.S. Application Data

[63] Continuation of application No. 08/405,052, Mar. 15, 1995, abandoned.

[30] Foreign Application Priority Data

Mar. 17, 1994 [JP] Japan .................................. 6-073879

[51] Int. Cl.$^6$ ................................................. B29D 30/30
[52] U.S. Cl. ........................ 156/123; 156/130; 156/133; 156/405.1
[58] Field of Search ................................... 156/130, 133, 156/123, 405.1, 406, 406.4, 406.6, 906, 264, 265, 512, 563; 211/194, 59.4; 425/DIG. 117; 108/53.3, 53.5; 206/599, 518, 505, 519, 509; 414/416

[56] References Cited

U.S. PATENT DOCUMENTS

| | | | |
|---|---|---|---|
| 2,473,067 | 6/1949 | Miller ..................................... | 156/405.1 |
| 2,665,806 | 1/1954 | Budd ....................................... | 206/599 |
| 3,083,845 | 4/1963 | Kuster ..................................... | 206/519 |
| 3,521,764 | 7/1970 | Loomis .................................... | 206/509 |
| 3,549,018 | 12/1970 | Wilson .................................... | 206/509 |
| 3,836,022 | 9/1974 | Ims ......................................... | 414/398 |
| 4,097,566 | 6/1978 | Bertin et al. ........................... | 264/40.7 |
| 4,211,324 | 7/1980 | Ohlbach .................................. | 206/518 |
| 4,333,573 | 6/1982 | Holoubek ............................... | 206/509 |
| 4,822,236 | 4/1989 | Inoue et al. ............................. | 414/591 |
| 5,385,626 | 1/1995 | Shimizu et al. ....................... | 156/406.4 |

FOREIGN PATENT DOCUMENTS

| | | | |
|---|---|---|---|
| 3119135 | 12/1982 | Germany ............................. | 156/405.1 |
| 979165 | 12/1982 | U.S.S.R. ............................... | 156/405.1 |

*Primary Examiner*—Geoffrey L. Knable
*Attorney, Agent, or Firm*—Jordan and Hamburg LLP

[57] ABSTRACT

The invention eliminates the drawbacks that strip-like members develop curling sets during storage and that the amounts of shrink of strip-like members vary, and minimizes the amounts of remnants of strip-like members after formation of one lot and the number of length measuring and cutting devices for strip-like members. A strip-like member 12 is formed in long size and cut into predetermined lengths during transfer on conveyers 13 an 14. The resulting strip-like members 12 of predetermined length are placed one by one on smooth-surfaced pallets 20, the latter being transferred to a tire building machine. One end of such strip-like member 12 on the pallet is brought into contact with the lower surface of the building drum 30. The building drum is rotated while the pallet is moved in the direction of the length.

7 Claims, 3 Drawing Sheets

METHOD OF ASSEMBLING PNEUMATIC TIRES

This application is a continuation of application Ser. No. 08/405,052 filed Mar. 15, 1995, now abandoned.

BACKGROUND OF THE INVENTION

This invention relates to a method of assembling pneumatic tires such as automobile tires.

Of the pneumatic tires, the bias tire is produced by applying an inner liner, a carcass, a breaker and a tread, in the order mentioned, to a cylindrical building drum, deforming the resulting cylindrical green case into a toroidal form, and vulcanizing the assembly. Further, the radial tire is produced by applying an inner liner, a carcass and a sidewall, in the order mentioned, to the building drum of a primary building machine to form a cylindrical primary case, transferring said primary case to the building drum of a secondary building machine to deform it into a toroidal form, applying a belt and a tread thereto, and vulcanizing the resulting green case.

And, conventionally, both in the building of radial tires and in the primary and secondary building of radial tires, the strip-like members other than the tread, i.e., the inner liner, carcass, sidewall, breaker, belt and the like, after being produced in the form of long strips, are superposed on a liner and then, together with said liner, wound in the form of a roll and this roll is conveyed to a rear region of the servicer of the building machine, where it is then rotatably installed, whereupon the liner is separated as said strip-like members are withdrawn from the roll, so that only the long strip-like materials are placed on the transfer belt of the servicer in their straightened state as they are classified into the inner liner, carcass and so on, on which belt the strip-like members are cut into predetermined lengths, the latter being fed to said building drum.

Conventionally, since a long strip-like member is wound in roll form and cut into predetermined lengths on the servicer of the building machine and then fed to the building drum, the strip-like members develop curling sets due to winding during storage. Furthermore, the curling sets in the strip-like members differ in curvature between beginning and end of the winding. For this reason, when the strip-like member is placed in its straightened state on the flat transfer belt of the servicer and cut into predetermined lengths, errors in measurement of length occur; thus, it has been necessary to apply tension thereto to remedy said curling sets. Further, internal stresses due to bending and compression are applied to the strip-like members during storage. Since maid internal stresses increase toward the portions of the strip-like members disposed in the core, i.e., on the winding-start side, there has been a problem that the amounts of shrink of the lengths into which a strip-like member has been cut increase as the winding-start side is approached.

Further, when several kinds of strip-like members corresponding to a single lot are stored in roll form, the elongations produced differ from member to member. Therefore, when the formation of one lot is completed, the respective amounts of remnants of strip-like members vary, and hence the number of tires for one lot is limited by the shortest strip-like member. When the amounts of winding of said strip-like member are increased so as to avoid this problem, a new problem arises that the amounts of remnants of strip-like members increase.

Further, whereas the extruder and related devices for producing strip-like members including said inner liner and carcass have a production capacity corresponding to several tire building machines, the servicer of the tire building machine is equipped with several transfer belts corresponding to the several kinds of strip-like members and each transfer belt has a length measuring and cutting device for the strip-like member. When it is desired to automate the tire building operation, a device for guiding the front end of a strip-like member to the servicer has to be installed for each transfer belt, raising a problem that the installation cost increases.

SUMMARY OF THE INVENTION

This invention dispenses with the roll winding of strip-like members, and is designed to cut strip-like members into predetermined lengths immediately after they have been formed, store said lengths in their straightened state, and then feed them to the building drum of a tire building machine, thereby eliminating the drawbacks that the strip-like members develop curling sets during storage and that the amounts of shrink of the strip-like members vary, minimizing the amounts of remnants of strip-like members after formation of one lot, dispensing with the conventional servicer and reducing the number of length measuring and cutting devices, simplifying the device for guiding the front end of a strip-like member to the building drum, saving the installation cost, and making it possible to minimize the lot size.

More particularly, this invention relates to a method of assembling pneumatic tires wherein two or more kinds of strip-like members of predetermined length, such as a carcass and a belt, which constitute a pneumatic tire are applied one by one in order on the building drum of a tire building machine, said method being characterized by the steps of forming each of said strip-like members in long size, cutting it into predetermined lengths while transferring it on conveyers, placing the resulting strip-like members of predetermined length one by one on flat-surfaced pallets, transferring such pallet with said strip-like member of predetermined length placed thereon to a tire building machine, contacting one end of said strip-like member on said pallet with the lower surface of the building drum of the tire building machine, and rotating said building drum while lengthwise moving said pallet.

The tire building machine mentioned above may be a building machine for bias tires, or a primary or secondary building machine for radial tires. As for examples of said strip-like members, mention may be made of inner liners, carcasses, breakers, and treads which are used for bias tires, inner liners, carcasses, and sidewalls which are used for the primary building of radial tires, and belts and treads which are used for the secondary building.

The pallets used in this invention comprise a flat plate and a leg for horizontally supporting said flat plate, and it is preferable to use pallets which are stackable and which are designed such that when they are stacked, upper and lower pallets vertically fit together to define a clearance between the upper and lower flat plates for receiving a strip-like member, in which case the storage space for pallets can be minimized and tens of pallets can be transferred in a unit. Further, said flat plates are preferably smooth-surfaced aluminum flat plates, in which case the strip-like members will not be deviated during storage unlike the case of flat plates of polyurethane or synthetic resin and, furthermore, said strip-like members can be more smoothly separated when they are to be applied to the building drum.

In addition, a strip-like-member after having been cut into predetermined lengths can be manually transferred to a predetermined position on pallets by the operator; however, preferably such length will be automatically transferred by sucking it by a vacuum pad. Further, in the case of a strip-like member which contains steel cords, it can be magnetically attracted and automatically transferred. Further, the pallets with strip-like members placed thereon may be loaded oh and transferred by a carriage or may be collectively transferred by a fork lift truck. Further, pallets with strip-like members of predetermined length placed thereon may be stored in that location or any desired location on the way to the tire building machine.

Since the strip-like member is cut into predetermined lengths without being wound in roll form after formation thereof, correct measurements of length can be made. And, the predetermined lengths into which the strip-like member has been cut are placed one by one in their straightened state on pallets, and transferred either directly or after storage to the tire building machine; therefore, there is no danger of them developing curling sets therein or of the portions having such curling set developed therein varying in curvature, and the amount of shrink after cutting becomes uniform, facilitating automation of the operation of applying strip-like members to the building drum.

Briefly stated, the present invention provides a method comprising the steps of forming a strip-like member, such as a carcass or belt, in long size, cutting it into predetermined lengths during transfer on conveyers, placing the resulting strip-like members of predetermined size one by one on flat-surfaced pallets, transferring such pallets with strip-like members of predetermined length placed thereon to a tire building machine, contacting one end of such strip-like member placed on the pallet with the lower surface of the building drum of said tire building machine, and rotating the building drum while moving the pallet in the direction of the length, thereby applying said strip-like member to said building drum. Thus, the given length cutting of strip-like members is accurately effected, and strip-like members thus cut in predetermined length are linearly mounted one by one on pallets and stored. Therefore, in contrast-with the prior art, there to no danger of strip-like members developing curling sets, and the amount of shrink after cutting is uniform. This arrangement facilitates the operation of applying strip-like members to the building drum, greatly reduces the number of length measuring and cutting devices for strip-like members, saves the installation cost, facilitates automation, eliminates remnants of strip-like members upon completion of building of tires in one lot, and makes it possible to reduces the lot size.

Additionally, the present invention further provides a flat plate and a leg for horizontally supporting said flat plate, said pallet being stackable such that when such pallets are stacked, upper and lower pallets vertically fit together to define a clearance between the upper and lower flat plates for receiving a strip-like member therein. Thus, this arrangement saves the storage space for pallets and facilitates transfer of pallets.

Another feature of the invention includes the pallet being an aluminum pallet whose flat plate has a smooth surface. Therefore, strip-like members placed on pallets hardly deviate during transfer or storage and can be smoothly separated when they are to be applied to the building drum, and hence unnecessary deformation does not occur in strip-like members.

The invention will now be described in more detail with reference to the accompanying drawings.

DESCRIPTION OF PREFERRED EMBODIMENTS

Figure 1:
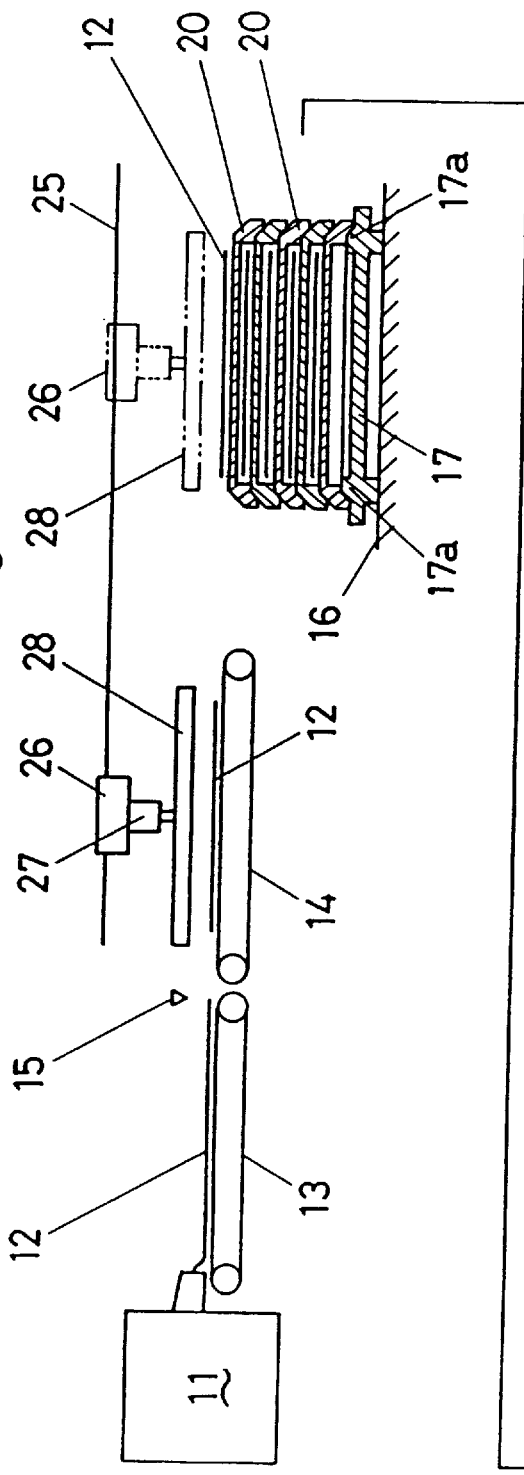
FIG. 1 is a process explanation view showing an embodiment of this invention.
Figure 1:
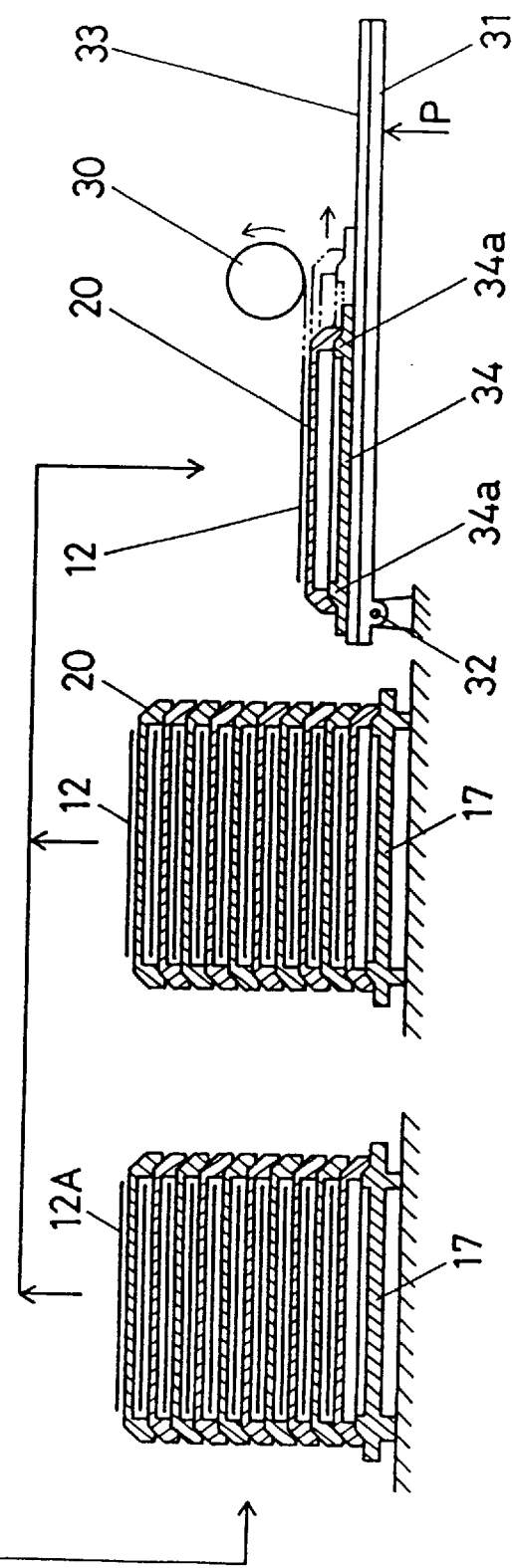

In FIG. 1, the numeral 11 denotes an extruder for inner liners (strip-like members) 12, (forming apparatus for strip-like members), said inner liner 12 being extruded onto a first transfer conveyer 13, from which it is transferred to a second transfer conveyer 14 disposed on the right-hand side. The length of the inner liner 12 transferred onto the second transfer conveyer 14 is measured, and when said length reaches a preset length, a cutter 15 positioned above the boundary between the first and second transfer conveyers 13 and 14 is actuated to cut it to provide a predetermined length. And, when the inner liner 12 of predetermined length carried on the second transfer conveyer 14 advances to a predetermined position, the second transfer conveyer 14 stops.

Figure 2:
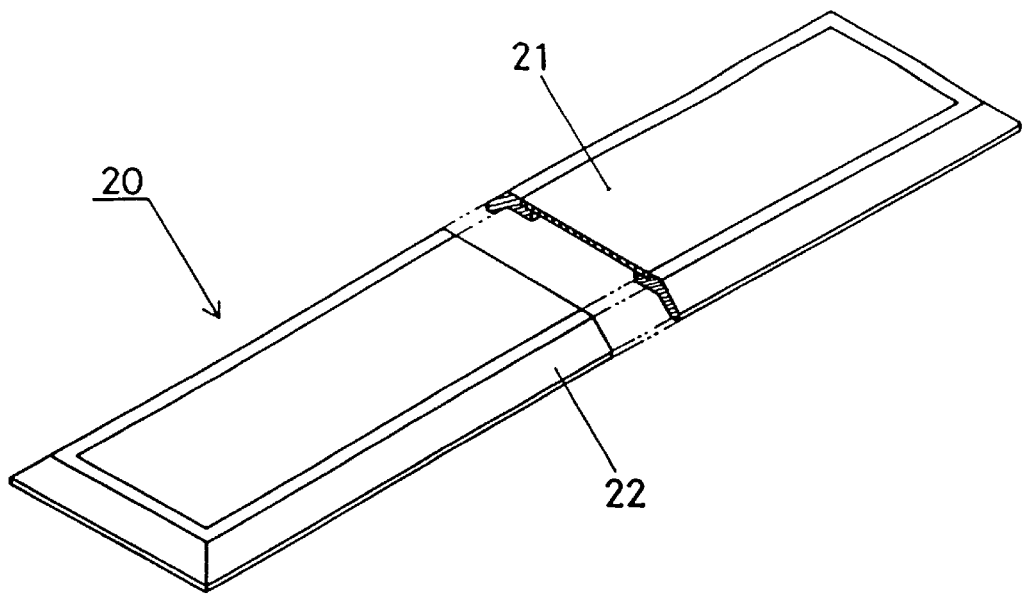
FIG. 2 is a perspective view showing an example of a pallet.
Figure 3:
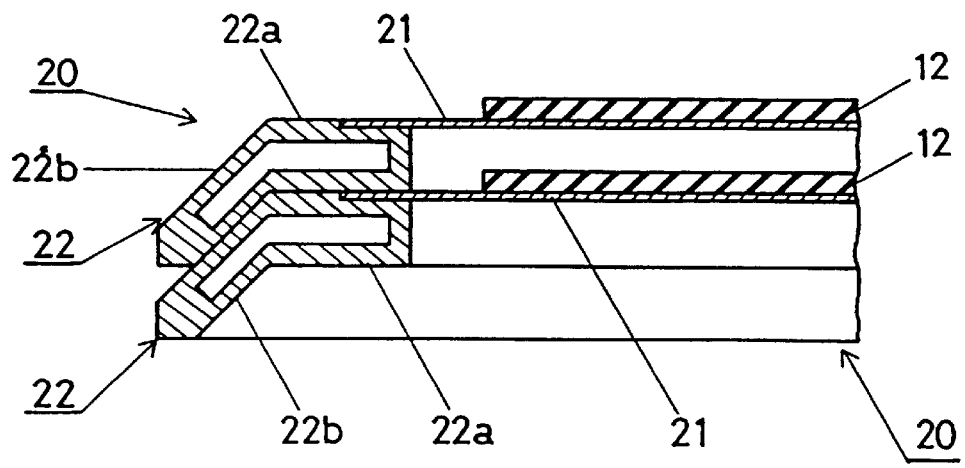
FIG. 3 is a view, in longitudinal section, of stacked pallets.

A pallet mounting rest 17 is installed in a predetermined position on a floor 16 forwardly of said second transfer conveyer 14, with pallets 20 stacked on said pallet mounting rest 17. Such pallet 20, as shown in FIG. 2, comprises an elongated rectangular flat plate 21, and a picture frame-like log 22 fixed to the lower surface of said flat plate 21 along its periphery. Said flat plate 21 is a smooth-surfaced flat plate of aluminum and is fixed to the upper surface of said picture frame-like leg 22 such that its surface is flat. And, said picture frame-like leg 22, as shown in FIG. 3, comprises a horizontal portion 22a fixed to the periphery of said flat plate 21, and an inclined edge portion 22b extending downward from the outer edge of said horizontal portion 22a and spreading on four sides at an equal angle, the arrangement being such that when a plurality of pallets 20 are stacked, the lower surface of the leg 22 of an upper pallet removably fits on the upper surface of the leg 22 of a lower pallet to the extent of not producing a play and a space capable of receiving said inner liner is defined between the upper and lower flat plates 21. The pallet mounting rest 17 (see FIG. 1) is provided with a ridge 17a adapted to engage the lower surface of the leg 22 of a pallet 20 so as to position the latter.

In FIG. 1, an overhead rail 25 is installed over said second transfer conveyer 14 and the pallet mounting rest 17, with a carrier 26 suspended from said overhead rail 25, said carrier 26 having a vacuum suction device 28 liftably attached to the lower surface thereof through a lifting device 27. The lifting device 27 is capable of lowering the suction device 28 to any desired height. Further, the suction device 28 is used to suck the inner liner 12 on the second transfer conveyer 14 and has a length substantially equal to that of the inner liner 12, the lower surface of said suction device being formed with a number of suction ports which are connected to a negative pressure source, such as a blower.

The carrier 26 traverses between a predetermined position on the second transfer conveyer 14 and the pallet mounting rest 17 fixed on a predetermined position on the floor 16 and sucks and holds an inner liner 12 placed on the second transfer conveyer 14 by the auction device 28 to transfer it to the position above the pallet mounting rest 17 and deliver it onto the uppermost empty one of the pallets stacked on the pallet mounting rest 17, whereupon the carrier 26 is returned to the position above the second conveyer 14. In the meanwhile, a now empty pallet 20 to placed either by mechanical power or by manpower on the pallet 20 in which said inner liner 12 has been placed.

In FIG. 1, the numeral 30 denotes the building drum of a primary building machine for radial tires, with a longitudinally (transversely as seen in the figure) elongated swing table 31 installed therebelow such that it is vertically swingable around the axis of a pivot 32 disposed in the rear, said swing table 31 being urged upward (in the direction of arrow P) at its front portion by energizing means such as an air cylinder. A longitudinally extending guide rail 33 to installed above said swing table 31, and a slide table 34 for carrying said pallet 20 thereon is placed on said guide rail 33. An in the case of the aforesaid pallet mounting rest 17, this slide table 34 is formed with a ridge 34a adapted to engage the lower surface of said pallet 20 and to driven for traverse on the guide rail 31.

A plurality of pallet mounting rests 17 corresponding to the kinds of strip-like members including said inner liners 12 to be applied to the building drum 30 are occasionally conveyed from the forming apparatus for strip-like members to predetermined positions in the rear of said owing table 31 (on the left-hand side in the figure) and removably installed thereat. For example, stacked on the right-hand side pallet mounting rest 17 in the figure are pallets 20 having inner liners 12 placed thereon, while pallets 20 having carcasses 12A placed thereon are stacked on the left-hand side pallet mounting rest 17. And, stacked on the other pallet mounting rests (not shown) are pallets having carcasses for the second ply placed thereon, pallets having sidewalls placed thereon, and so on.

In the above construction, a long-sized inner liner 12 formed by an extruder (forming apparatus for strip-like members) is transferred to the right as seen in the figure by the transfer conveyers 13 and 14 and cut into predetermined lengths by the cutter 15, such inner liners 12 of predetermined length being transferred from the second transfer conveyer 14 to the pallets 20 on the pallet mounting rest 17 positioned forwardly thereof one by one for each traverse of the carrier 25. When the number of pallets 20 with inner liners 12 placed thereon reaches a predetermined value, these pallets 20 together with the pallet mounting rest 17 are transferred to the rear of the building drum 30 of the primary building machine.

Similarly, a carcass 12A for the first ply, a carcass for the second ply, a sidewall and the like are formed by their respective forming apparatuses, cut into predetermined lengths on transfer conveyers, and transferred onto pallets on pallet mounting rests. When the number of said pallets reaches a predetermined value, such strip-like members are transferred together with the pallet mounting rest to the rear of the building drum 30. Thus, the pallet mounting rest for inner liners 12, a pallet mounting rest for carcasses 12A for the first ply, a pallet mounting rest for carcasses for the second ply, and a pallet mounting rest for sidewalls are disposed in the rear of the building drum 30.

Subsequently, one pallet 20 is taken out from the pallet mounting rest 17 for inner liners 12 and mounted on the slide table 34 on the swing table 31. As the slide table 34 advances, the front end of said inner liner 12 reaches a location below the building drum 30, whereupon the swing table 31 is upwardly urged to press the front end of the inner liner 12 against the lower surface of the building drum 30, whereafter the building drum 30 and slide table 34 are synchronously driven to apply the inner liner 12 to the surface of the building drum 30. In the same manner, a carcass 12A for the first ply, a carcass for the second ply and a sidewall are applied in the order mentioned to complete the primary building.

In the above embodiment, the building drum 30 may be the building drum of the secondary building machine for radial tires, in which case at least two kinds including belts and treads are separately placed on pallets 20. Further, said building drum 30 may be one for bias tires, in which case inner liners and two or more kinds including carcasses, breakers and treads are separately placed on pallets 20.

Figure 4:
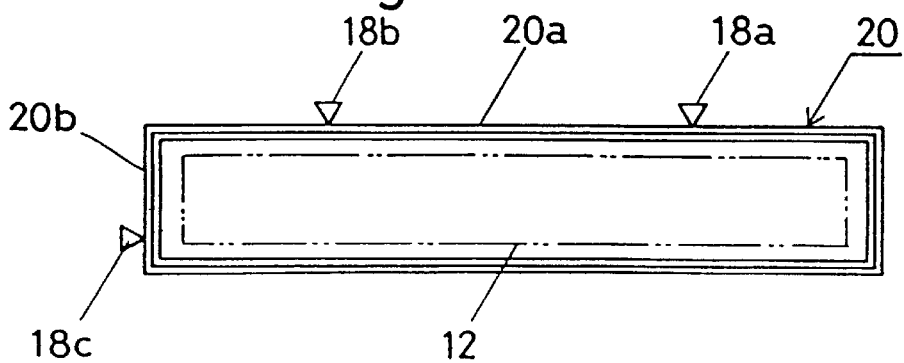
FIG. 4 is plan view showing pallet positioning means.

Further, in the case of placing an inner liner 12 or other strip-like member formed in long size and cut in predetermined length on a pallet 20, in the case of placing such pallet 20 having an inner liner 12 or other strip-like member placed thereon at a predetermined position for storage, and in the case of mounting such pallet 20 having an inner liner 12 or other strip-like member placed thereon on the slide table 34 below the building drum, it is preferable, as shown in FIG. 4, to position the pallet 20 by means of stops 18a and 18b to be contacted by two points on a longer side 20a of the pallet 20 and a stop 18c to be contacted by one point on a shorter side 20b of the pallet 20 and ensure that the same three points on the pallet 20 always contact the stops 18a, 18b and 18c, in which case even if the pallet 20 is distorted, the position of the inner liner 12 or other strip-like member placed on the pallet 20 can be accurately and easily controlled.

Figure 5:
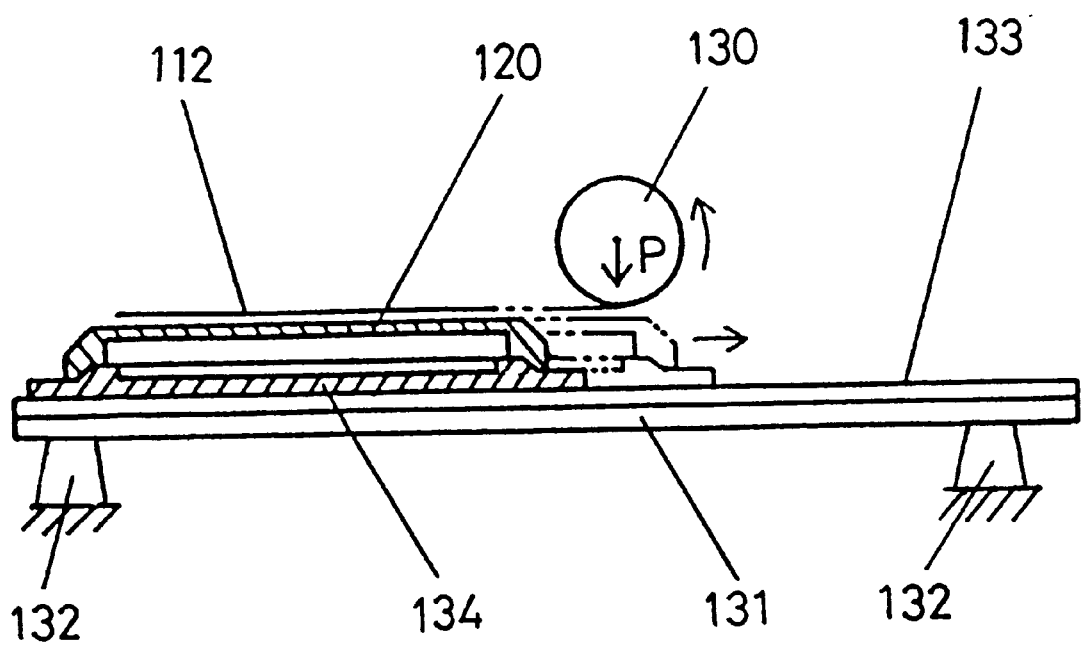
FIG. 5 corresponds to a part of the view of FIG. 1 but shows another embodiment of this invention.

FIG. 5 shows a further embodiment of this invention, which provides another means for pressing the front end of the inner liner 112 against the lower surface of the building drum 130. In lieu of a owing table 31 shown in FIG. 1, a stationary table 131 is employed and a building drum 130 is movable wherein the shaft thereof (not shown) is downwardly urged (in the direction of arrow P). When the slide table 134 advances, the front end of on inner liner 112 reaches a location below the building drum 130, whereupon the building drum 130 is urged downwardly to press the front end of the inner liner 112 against the lower surface of the building drum 130.

What is claimed is:

1. A method of assembling pneumatic tires from material strips, the method comprising:

dispensing material stock for said material strips in a substantially continuous manner onto a conveyor;

cutting said material stock into predetermined lengths to form said material strips during transport of said material stock on said conveyor;

transferring said material strips to flat pallets and stacking said flat pallets atop one another to form stacks, said flat pallets having legs with inside leg surfaces;

transferring said flat pallets individually from said stacks to a slide table disposed beneath a tire building drum and slidably on a supporting table extending on either side of said tire building drum a length sufficient to support said slide table throughout travel applying said material strips to said tire building drum, said slide table having ridges for engaging said inside leg surfaces of said flat pallets to secure said flat pallets at a predetermined position on said slide table;

effecting relative displacement of said slide table and said tire building drum to bring each of said material strips on said flat pallets into contact with said tire building drum; and advancing said slide table on said supporting table and rotating said tire building drum synchronously to effect wrapping of said material strips on said tire building drum one at a time.

2. A method of assembling pneumatic tires from material strips, the method comprising:

dispensing material stock for said material strips in a substantially continuous manner onto a conveyor;

cutting said material stock into predetermined lengths to form said material strips during transport of said material stock on said conveyor;

transferring said material strips to flat pallets and stacking said flat pallets atop one another to form stacks;

said flat pallets each having a flat plate and leg members disposed on peripheral edges of said flat plate for vertically supporting said flat pallets in a stack with said leg members separating said flat plates a distance greater than a thickness of said material strips and having slanted outside leg surfaces;

said leg members having slanted inside leg surfaces for engaging said slanted outside leg surfaces of another of said flat pallets beneath a respective one of said flat pallets when said flat pallets are in a stacked arrangement to prevent relative lateral motion of said flat pallets;

transferring said flat pallets individually from said stacks to a slide table disposed beneath a tire building drum and slidably disposed on a supporting table extending on either side of said tire building drum a length sufficient to support said slide table throughout travel applying said material strips to said tire building drum, said slide table having ridges with slanted ridge surfaces for engaging said slanted inside leg surfaces of said flat pallets to secure said flat pallets at a predetermined position on said slide table;

effecting relative displacement of said slide table and said tire building drum to bring each of said material strips on said flat pallets into contact with said tire building drum; and advancing said slide table on said supporting table and rotating said tire building drum synchronously to effect wrapping of said material strips on said tire building drum one at a time.

3. A method of assembling pneumatic tires as set forth in claim 2, wherein said flat pallets are aluminum and said flat plates have smooth top surfaces.

4. The method of claim 2 wherein said effecting relative displacement includes moving said tire building drum downward to engage said material strips with said tire building drum while maintaining said slide table and said supporting table in a vertically fixed position.

5. The method of claim 2 wherein said effecting relative displacement includes moving said supporting table and said slide table upward to engage said material strips with said tire building drum while maintaining said tire building drum in a vertically fixed position.

6. The method of claim 5 wherein said moving said slide table upward to engage said material strips includes said supporting table being a swing table which is pivotally mounted at one end of the swing table and pivoting said swing table upward to effect engagement of said material strips with said tire building drum.

7. An apparatus for assembling pneumatic tires from material strips, comprising:

flat pallets each having a flat plate upon which said material strips are placed and leg members disposed on peripheral edges of said flat plate for vertically supporting said flat pallets in a stack with said leg members separating said flat plates a distance greater than a thickness of said material strips and having slanted outside leg surfaces;

said leg members having slanted inside leg surfaces for engaging said slanted outside leg surfaces of another of said flat pallets beneath a respective one of said flat pallets when said flat pallets are in a stacked arrangement to prevent relative lateral motion of said flat pallets;

a slide table disposed beneath a tire building drum and slidably disposed on a supporting table extending on either side of said tire building drum a length sufficient to support said slide table throughout travel applying said material strips to said tire building drum, said slide table having ridges with slanted ridge surfaces for engaging said slanted inside leg surfaces of said flat pallets to secure said flat pallets at a predetermined position on said slide table;

means for effecting relative displacement of said slide table and said tire building drum to bring each of said material strips on said flat pallets into contact with said tire building drum; and means for advancing said slide table on said supporting table and rotating said tire building drum synchronously to effect wrapping of said material strips on said tire building drum one at a time.

* * * * *